United States Patent [19]

Kaplan

[11] Patent Number: 5,477,507
[45] Date of Patent: Dec. 19, 1995

[54] RIBBON SPLICING METHOD AND APPARATUS

[75] Inventor: Robert L. Kaplan, San Diego, Calif.

[73] Assignee: Hughes Aircraft Company, Los Angeles, Calif.

[21] Appl. No.: 102,319

[22] Filed: Sep. 8, 1987

Related U.S. Application Data

[63] Continuation of Ser. No. 798,642, Nov. 15, 1985, abandoned.

[51] Int. Cl.$^6$ .................. H04B 11/00; H02G 15/064; H02G 15/184
[52] U.S. Cl. ............. 367/191; 29/868; 174/73.1
[58] Field of Search ............ 24/117, 122, 122.6, 24/131 R, 140, 141; 29/458, 461, 748, 868, 869, 871, 872, 873, 885; 33/DIG. 7; 114/253; 174/70 S, 72 TR, 73 R, 101.5, 102 E, 102 F, 112; 339/278 C, 278 D; 367/15, 19, 20, 106, 130, 153–156, 169, 191; 403/216; 428/378

[56] References Cited

U.S. PATENT DOCUMENTS

| | | | |
|---|---|---|---|
| 3,450,829 | 6/1969 | Paul | 29/868 |
| 3,725,581 | 4/1973 | Coillemot et al. | 174/117 F |
| 3,763,554 | 10/1973 | Early | 174/117 F |
| 3,816,641 | 6/1974 | Iverson | 29/868 X |
| 3,879,843 | 4/1975 | Cunningham | 29/871 |
| 3,994,090 | 11/1976 | Wheeler | 174/112 X |
| 4,121,325 | 10/1978 | Bruinette et al. | 403/216 X |
| 4,317,185 | 2/1982 | Thigpen et al. | 174/101.5 X |

OTHER PUBLICATIONS

Spectra–Strip Flat Ribbon Cable Brochure, pp. 1–8, U.S.A., Jun. 20, 1971.
Spectra–Strip Brochure, Great Connections with Flat Ribbon Cable, pp. 1–10, U.S.A., Feb. 20, 1974.

*Primary Examiner*—Charles T. Jordan
*Attorney, Agent, or Firm*—Wanda K. Denson-Low; Michael W. Sales; Georgann S. Grunebach

[57] ABSTRACT

Ribbon made of long fibers has each of its ends separated into four bundles. The four bundles of each end carry the same four discrete indicia arranged in a different pattern. The bundles are inter-engaged so that the bundles of the same indicia lie together throughout the entire length of the splice. A splicing apparatus including clamps and guide loops holds the first set of bundles in place while the second set of bundles is inter-engaged therewith. Clamps are also provided to hold the ribbon ends in place.

5 Claims, 6 Drawing Sheets

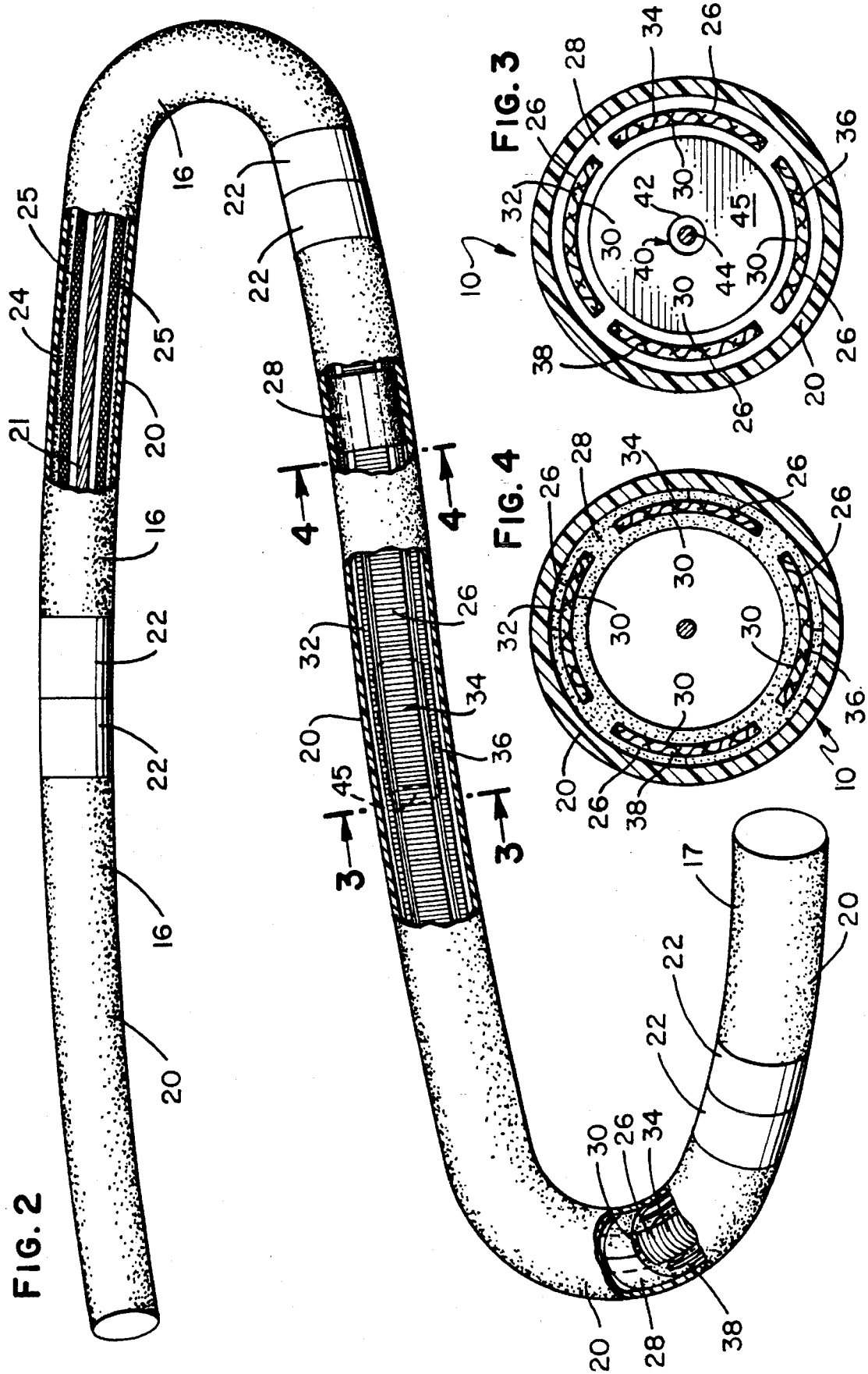

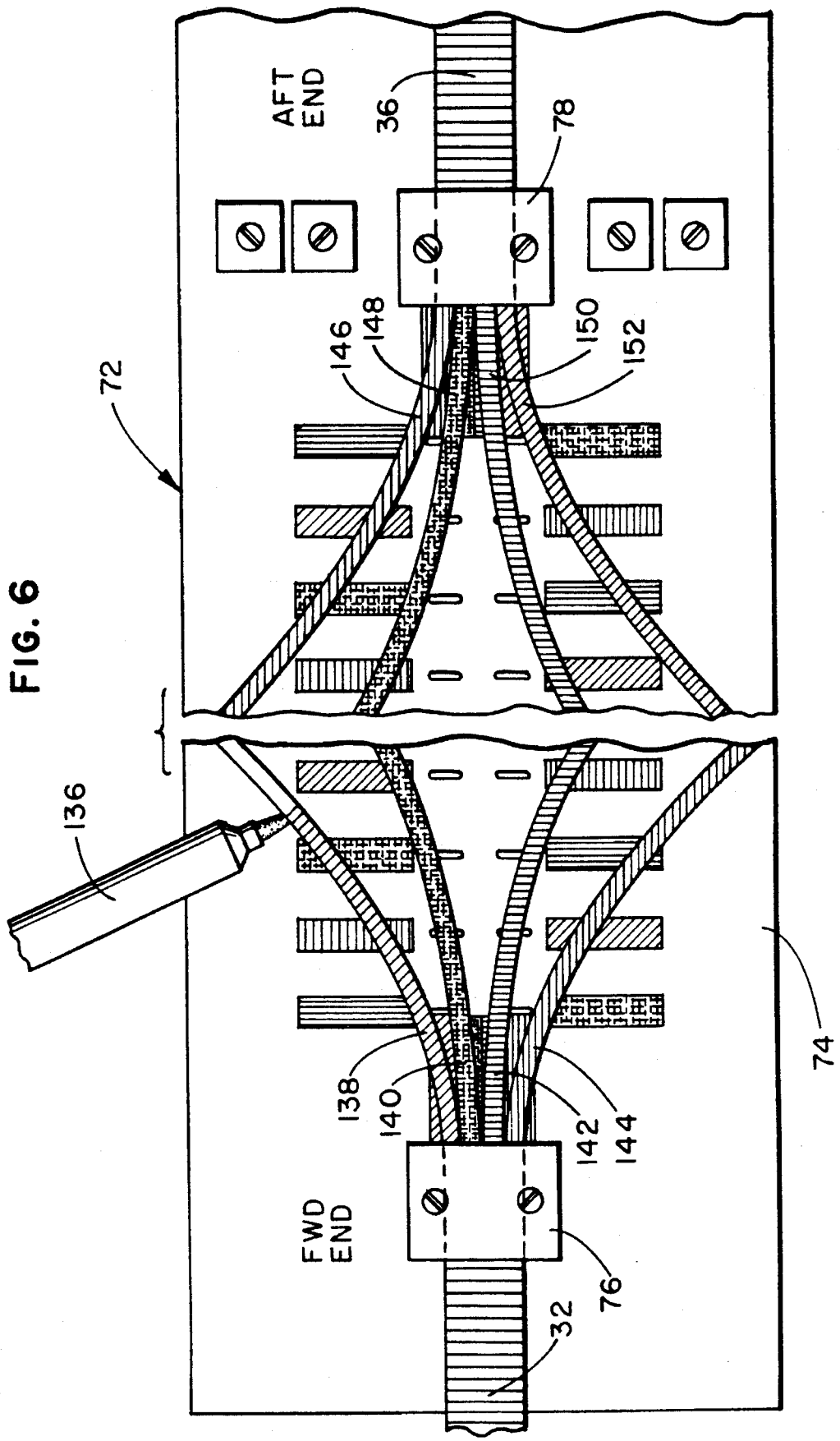

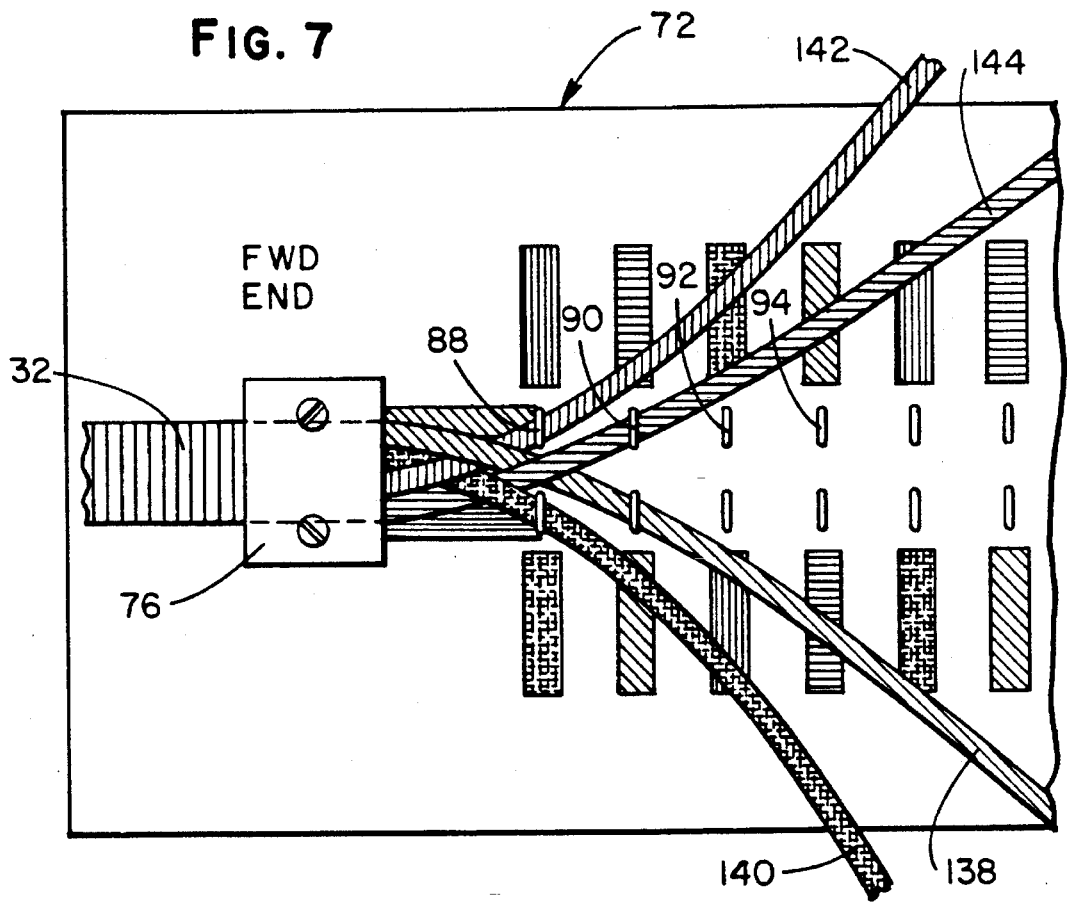
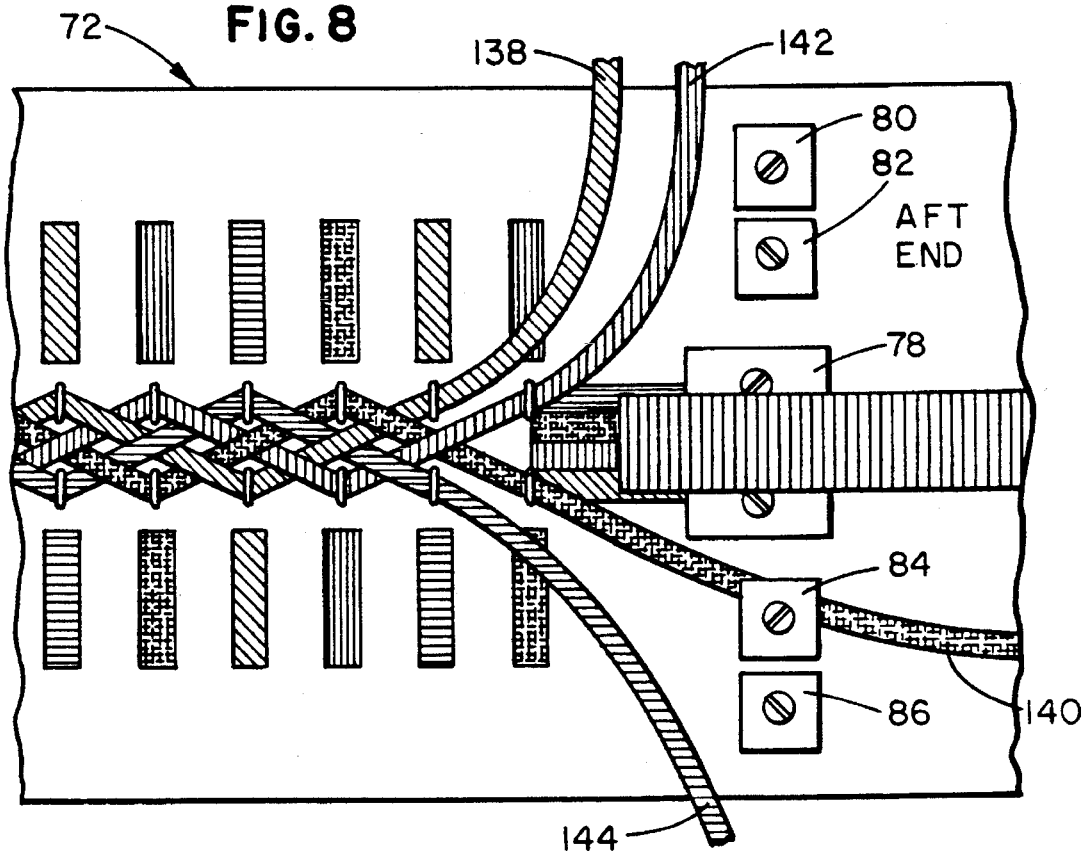

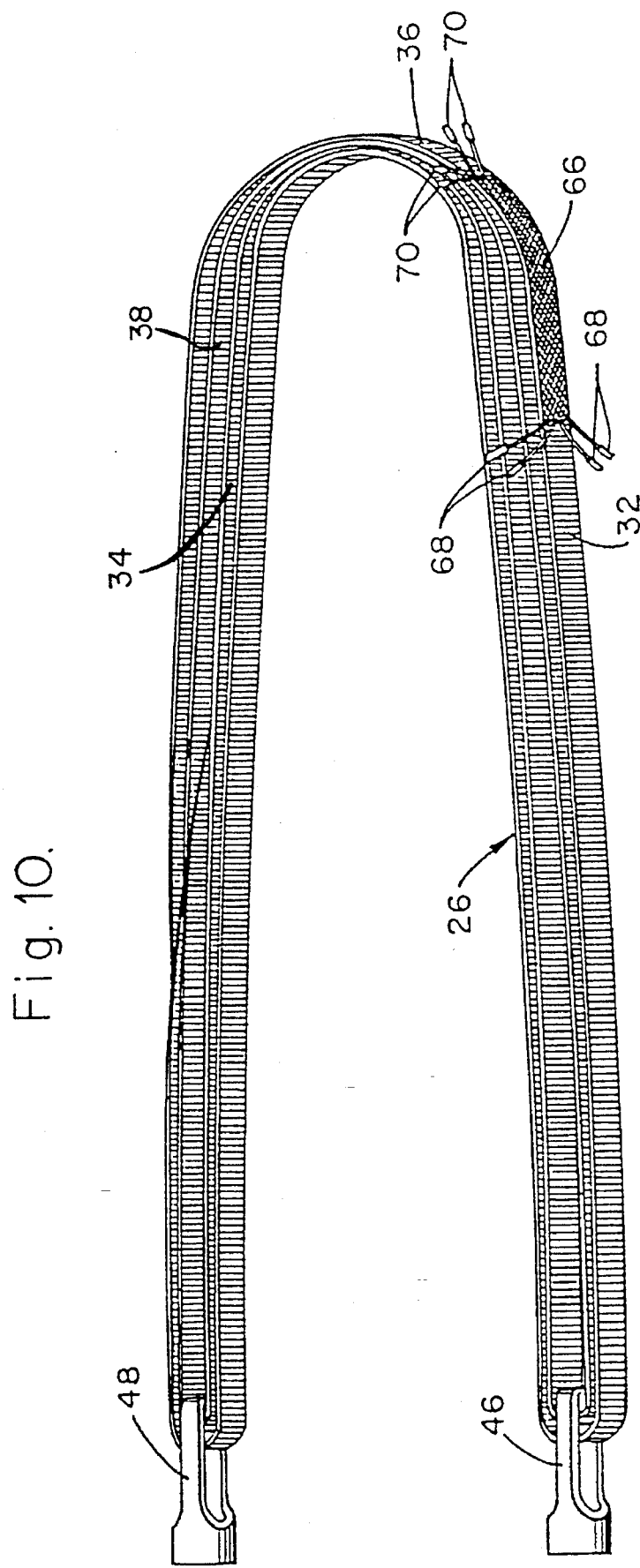

5,477,507

RIBBON SPLICING METHOD AND APPARATUS

The Government has rights in this invention pursuant to Contract No. N00024-80-C-6347 awarded by the Department of the Navy. This application is a continuation of application Ser. No. 798,642, filed Nov. 15, 1985, now abandoned.

BACKGROUND OF THE INVENTION

This invention relates to a sonar towed array and, more particularly, to a ribbon strength member splicing method and apparatus for a high-strength, thin-line towed sonar array.

Generally, sonar arrays are towed up to a mile or so behind the towing vessel. The towed array is deployed by unwinding it from the spool of a winch, on which it is stowed when not in use. The array may be on the order of 1500 feet in length and one inch in diameter, and is generally made in sections or modules of about 90 feet in length, which are joined together by means of an electro-mechanical coupling. An internal strength member runs the length of each module, and functions to carry the tensile load on each module, mainly caused by drag of the array is it is towed.

The strength member in each module carries the principal accumulated stress of the array. Each strength member must be connected to a termination member to transfer the tensile load of the strength member to the electro-mechanical coupling at each end of a module. The tensile load, of each module is thus successively transferred to the next forward module, until the entire load of the array is passed through the forward-most strength member termination and electro-mechanical coupling to a steel tow cable and thence to a towing vessel.

Some modules are acoustic modules, and contain sensitive acoustic sensors. In order to provide space for the sensors and to prevent unwanted acoustic signals from being passed to these sensors, a flat or ribbon-type strength member is employed in the acoustic modules. This ribbon-type strength member is arranged inside the walls of the tubular jacket of the module so that it does not have mechanical contact with the sensors, to minimize the transfer of unwanted acoustic signals.

Kevlar, a synthetic material produced by E. I. DuPont de Nemours & Co., is frequently used as the strength member in military and commercial towed sonar and sounding arrays. See U.S. Pat. No. 4,160,229 to McGough, and U.S. Pat. No. 4,090,168 to Miller, et al. Kevlar is an aramid, which is the generic name for a distinctive class of aromatic polyamide fibers. Kevlar has an extremely high tensile strength, and greater resistance to elongation than steel.

Kevlar is very difficult to secure at the end terminations because, although it is very strong in tension, it is very easily damaged when it is secured in conventional ways. It has been found that one of the best ways to terminate a strength member made of Kevlar ribbon braid is to splice the ends together to form a continuous loop, and to pass the loop over smooth, large radius pins on the termination members.

In splicing the ends of the Kevlar ribbon to form a continuous loop, it was found difficult to make reproducible, identical splices of consistent high quality, strength and performance. There was a tendency for each splice to be different, with many mistakes being made during splicing, without the mistakes being recognized by the splicer.

SUMMARY OF THE INVENTION

In order to aid in the understanding of this invention, it can be stated in essentially summary form that it is directed to an apparatus including a fixture including specifically located and color coded wire loops and clamps. The method includes color coding the filaments of two ribbons, and braiding them together by passing the filament bundles, in turn, through matching colored wire loops in a predetermined sequence.

Accordingly, it is a purpose and advantage of this invention to provide a method and apparatus that enables a splice made in a ribbon strength member to be exactly duplicated each time a splice is made.

Another purpose and advantage of the invention is to provide a means to manufacture the splice, inspect it, and control the quality of the splice.

A further purpose and advantage of the present invention is the provision of a method and apparatus for splicing Kevlar ribbon braid that can be used to produce the exact splice without requiring previous training or practice at splicing or braiding.

The foregoing and other purposes and advantages of the present invention may be more readily understood with reference to the following detailed description taken in conjunction with the accompanying drawings.

BRIEF DESCRIPTION OF THE DRAWINGS

FIG. 2 is an illustration in perspective of a length of the sonar towed array assembly of FIG. 1, partly broken away to show the ribbon strength member in the interior thereof.

FIG. 3 and FIG. 4 are cross-sectional view of the length of towed array shown in FIG. 2, taken along the lines 3—3 and 4—4, respectively.

FIGS. 6–9 illustrate different steps in splicing the ribbon strength member according to the method of the present invention.

FIG. 10 is a perspective view of a continuous loop strength member threaded through the four pin-surfaces of the two terminations, showing the splice, but without the spacers usually used to hold the four legs of the loop equally spaced close to the inside jacket wall.

DESCRIPTION OF THE PREFERRED EMBODIMENT

Figure 1:
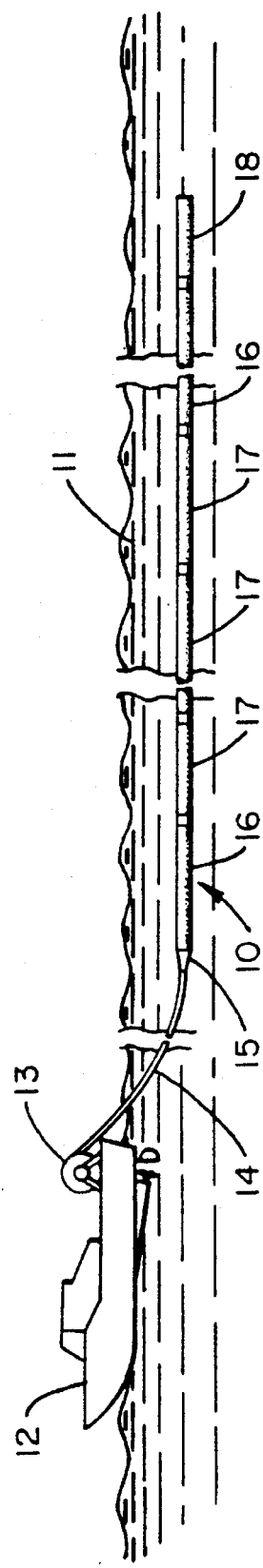
FIG. 1 is a pictorial view of a sonar array assembly being towed through the water by a towboat.

Referring to FIG. 1 of the drawings, a sonar towed array assembly 10 is in operating position under the surface of a body of water 11 in tow behind a marine vessel 12. The vessel 12 may be a surface vessel, as shown, or the vessel 12 may be a submarine. The vessel 12 is equipped with a winch 13 having a spool on which the sonar towed array assembly 10 can be stowed, when desired. The sonar towed array assembly 10 comprises a cable 14, which includes electrical signal conductors and a stress member such as a steel towing cable. The cable 14 may be attached to a nose cone 15 which is followed by one or more vibration isolation modules 16 and one or more acoustic modules 17. The sonar towed array assembly 10 terminates in a drogue 18.

As shown in FIG. 2, each of the sonar array modules 16, 17 comprises an elongated hollow jacket 20 formed of a flexible material having suitable strength, abrasion resistance, acoustic, viscoelastic and chemical resistance properties. Polyvinylchloride has been used for the jacket 20 on the acoustic modules 17, and polyurethane has been found satisfactory as a jacket for the vibration isolation modules 16.

This outer jacket 20 resembles a hose, and in the embodiment is about one inch in diameter. Individual modules 16, 17 are usually about 90 feet in length, and are joined together by electro-mechanical couplings 22. The jacket 20 is filled with a liquid filler 24 such as Exxon Isopar-L, or the like, which is slightly pressurized to maintain the shape of the array modules 16 and 17. The purpose of the liquid filler 24 is to replace the compressible air with a substantially incompressible liquid. The liquid filler 24 must be an electrical insulator, and must have certain other desirable physical characteristics, such as those provided by Exxon Isopar-L.

In FIG. 2 it may be seen that the vibration isolation module 16 contains a resilient elastic rope 21 made of nylon or the like and round, rope-like strength members 25, whereas the acoustic module 17 contains a flat ribbon-type strength member 26.

FIGS. 3 and 4 are cross-sectional drawing of the acoustic module 17 of the sonar array assembly 10 shown in FIG. 2. Many different elements are distributed along the length of the array assembly 10. The hydrophones (not shown) are each encased in its own plastic tube with its own fluid. Besides the hydrophones, there are other electronic components for telemetry and power such as canister 45 and electrical cables, including coaxial cable 40. There is preferably a hard spacer 28 inside the array assembly 10. In FIG. 3 it may be seen that the flat, ribbon strength member 26 passes within the inner wall jacket 20 and outside of canister 45 without being in mechanical contact with the canister 45. As shown at the left of FIG. 2 this is due to the flat ribbon strength member 26 being threaded through rubber spacer 28.

In FIG. 3, a coaxial cable 40, having an outer conductor 42 and an inner conductor 44, may be seen in the center of the sonar array assembly 10. Also, the cylindrical canister 45, containing electronics, may be seen inside the four legs 32, 34, 36, 38 of the strength member 26. This is to show how the flat strength member 26 is arranged in curves around the jacket wall so as not to have mechanical contact with the electronic elements, such as the hydrophones or amplifiers As was pointed out, the ribbon strength member is preferably made of Kevlar, a synthetic aramid material produced by E. I. DuPont de Nemours & Co. This material approaches steel in strength and in elasticity, and is light in weight. However, it may be damaged by being compressed, kinked, cut or bent around a tight radius. Thus, the problem is to transfer the stress in the Kevlar ribbon strength member to a mechanical termination member without subjecting it to any such damaging conditions.

In FIG. 4 the flat, ribbon strength member 26, is seen threaded through the two termination members 46, 48 showing how the ends of the strength member 26 are joined together by the splice 66. The ends of individual bundles 68 of fibers from first leg 32, and the bundles 70 of fibers from third leg 36 may be seen protruding from the splice 66. Thus, the strength member 26 is a continuous piece which forms two loops because it is looped twice through the end terminations 46 and 48 to form a double loop having four legs 32, 34, 36 and 38.

For clarity, the strength member 26 is shown in FIG 4 without the other elements of the array assembly 10, such as spacers 28 and the outer jacket 20. Also, the four legs 32, 34, 36 and 38 are not shown arranged in an orthogonal relationship in this figure, as they normally would be when under tension, and spaced apart by the spacers 28.

Figure 5:
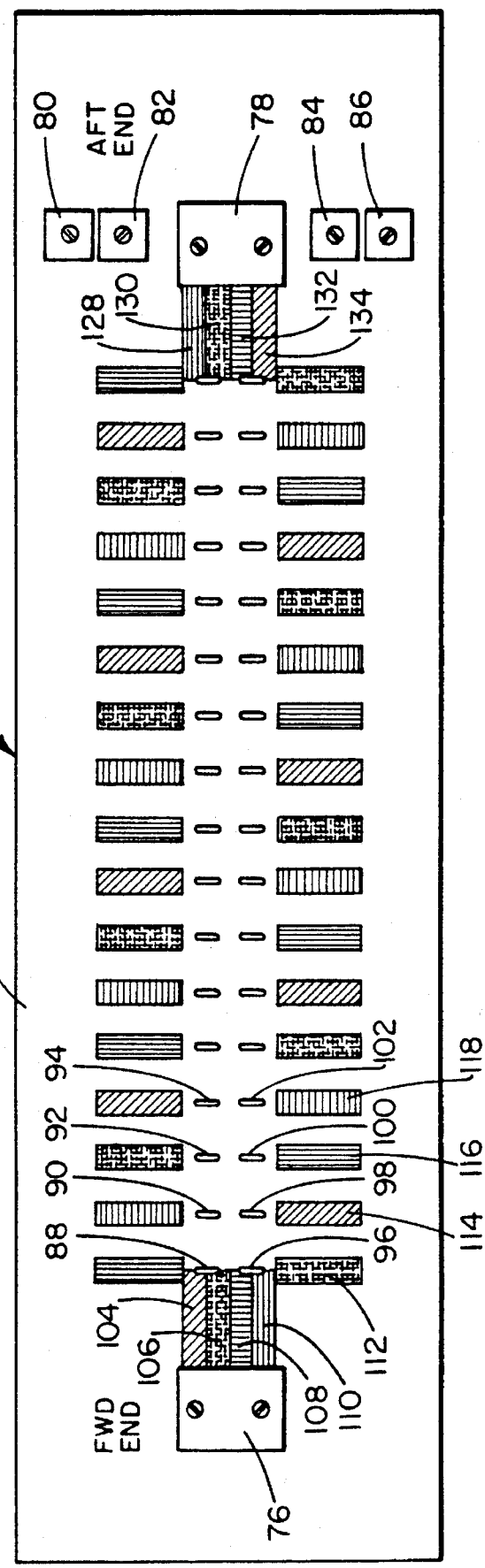
FIG. 5 is a plan view of a fixture for splicing the ribbon strength member.

FIG. 5 shows the splicing fixture 72 in plan view while FIG. 6, 7, 8, and 9 show the fixture, with parts broken away, in use. Fixture 72 comprises a flat baseboard 74 which is designated with its left end as the forward end and its right end as the aft end. Flat clamp 76 is centrally located at the forward end and corresponding clamp 78 is positioned adjacent the aft end. In addition, the aft end also carries bundle clamps 80, 82, 84 and 86. A plurality of guide loops is positioned on the top of the baseboard between the flat clamps. These guide loops maybe in the form of inverted U shape staples, preferably of the type with a full radius curvature between the legs. The guide loops 88, 90, 92 and 94 are shown as positioned along a row, starting from left to right in the upper row and corresponding guide loops 96, 98, 100, and 102 are positioned adjacent thereto on the opposite sides of the longitudinal center line and opposite the first designated set of guide loops. A sufficient number of guide loops is provided so that an adequate number of braided inter-engagements occur. Furthermore, the pitch of the guide loops is important to braiding for strength.

In the present instance, the guide loops extend 0.40 inches up from the top of the baseboard and have a longitudinal pitch which is important to the reliability of the braided joint. When seventeen longitudinally spaced guide loops are provided the space between the first two on each end, for example between guide loops 96 and 98, is 0.80 inches. The next spacing is 0.70 inches. The next spacing, between guide loops 100 and 102 is 0.60 inches. The spacing decreases by 0.10, with each guide loop until the guide loops are spaced 0.40 inches apart. At the right end, the pitch increases by 0.10 inches each space until the right most are spaced 0.80 inches, the same as at the left end. The flat clamps and guide loops are color coded by color bands. Green band 104 and yellow band 106 are shown at forward clamp 76 as are red band 108 and blue band 110. Yellow, green, red, and blue markers 112, 114, 116, and 118 are respectively shown adjacent guide loops 96, 98, 100, and 102. These color markers are repeated in the same cycles to identify the guide loops along each side of the fixture. At the aft end of the fixture, blue, yellow, red and green bands, 128, 130, 132, and 134 are positioned between the guide loops and the aft end clamp 78.

The ribbon shaped strength member to be braided is supplied as continuous strands of aramid fiber which are cross-woven to maintain the flat ribbon shape, and then the structure is coated with polyvinylchloride. In prepare the ends of the ribbon for splicing, the polyvinylchloride coating is stripped from the end to be spliced, fifteen inches in the present example. Using a pointed tool, such as a scribe, the cross-woven fiber thread is removed from the stripped area. Thereupon, the ends 32 and 36 of the ribbon are respectively clamped in the forward and aft end clamps 76 and 78 as shown in FIG. 6. The fibers of each end are separated in four equal bundles. The ends of the bundles are individually secured at the free ends, for example, by means of heat shrink tubing shrunk thereover. Next, each bundle is marked in accordance with the color of the bands adjacent the clamps. Dye applicator 136 is employed. It is preferable to mark the entire length of each bundle, as shown in FIGS. 6 through 9, but the process could be simplified by using color or otherwise coded shrink tubing on the outer ends of each bundle. As seen in FIG. 6, green, yellow, red, and blue bundles, 138, 140, 142, and 144 are identified on ribbon end 32 extending from clamps 76. In similar matter, blue, red, yellow, and green bundles 146, 148, 150, and 152 are identified on end 36 extending from clamp 78.

In FIG. 6, the left end is the forward end while the right end is the aft end. Bundle 138 is the farthest bundle while bundle 144 is the nearest. Bundles 138 and 144 are the outer bundles while bundles 140 and 142 are the inner.

Starting with the forward ribbon end 32, the red is bundle is crossed over the yellow bundle and each threaded through the first matching colored loop. The blue bundle passes under the yellow bundle and into the first blue colored loop as seen in FIG. 7. The green bundle is crossed over the red bundle then under the blue bundle and into its corresponding loop. This completes one tuck with each bundle preceding from its previous loop (in this case the clamp 76), to its next corresponding loop. The tucks continue until the bundles pass through the last loops, as shown in FIG. 8. After each tuck is completed, the two bundles on each side of the splice are grasped and pulled taut. The next tuck is started with the yellow bundle and the lacing of the bundles along the fixture is continued in the same pattern, always completing one tuck before advancing a bundle to its next loop. The outer bundles are advanced first, starting with the nearest one and the over and under pattern is maintained. If the bundle has previously crossed over a bundle, it will pass under the next bundle and vice-versa.

Figure 9:
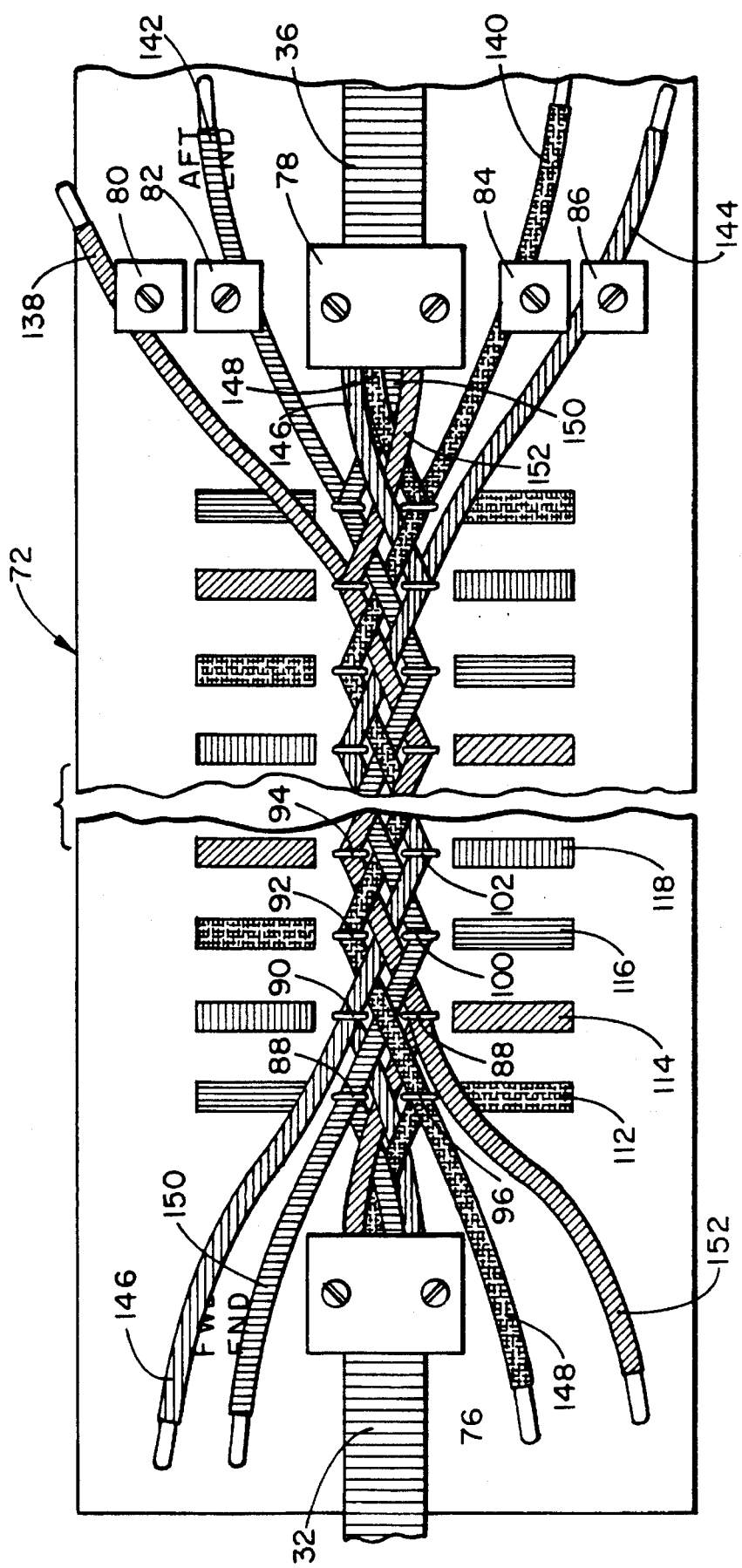

When the end of the fixture is reached, each bundle is passed through its corresponding guide loop, pulled taut and clamped into its corresponding clamp. FIG. 8 shows the clamping of yellow bundle 140 in clamp 84. The remainder of the clamping is shown at the right of FIG. 9. A bundle on the near side crosses over a bundle forward of its guide loop and passes under a bundle aft of the loop. On the far side, the opposites holds true. With these rules in mind, this state of the splicing can be inspected.

The other end 36 of the ribbon has already been clamped in place, bundled and identified as shown in FIG. 6. There are color bands adjacent to clamp 78, corresponding to the colors of the bundles. These color markers are seen in FIG. 8 but are mostly hidden in FIG. 6.

The bundles of the forward end are positioned and now the bundles of the aft end are braided therewith. First, cross the yellow bundle over the red bundle and thread each bundle through the first matching colored loop as seen in FIG. 9. The aft end bundles must always pass through the guide loops over the forward end bundles which already occupy that space. Pass the blue bundle under the red bundle and under the forward ends, yellow bundle and through the blue loop. Cross the green bundle over the yellow bundle, under the blue bundle and over the forward ends red bundle into the green loop. As before, this completes one tuck.

Each aft end bundle should now occupy a matching colored loop which is also occupied by a forward end bundle of the same color. After each tuck, the bundles should be pulled taut. Thereupon, the lacing of the aft end bundles continues, following exactly the same colored forward end bundles, always passing through the loop over the forward end bundle. The outer bundles are always laced first, starting with the one farthest away. Each tuck is completed and pulled taut before a bundle is advanced to the next loop. When correctly performed, the bundles now follow a perfect over and under pattern. When the end of the fixture is reached, this splice looks as it is shown in FIG. 9. The splice is inspected to insure that each colored loop is occupied by a matching colored forward end bundle and matching colored aft end bundle. The splice is also inspected to insure that the over and under pattern is maintained. If desired, hooks can be attached to the free ends of the bundle to aid in pulling the bundles through the guide loops. After inspection is complete, the guide loops are removed from the baseboard, the bundles and ribbons are unclamped, and the splice is removed from the fixture. The spliced ribbon is ready for service.

The termination member for a Kevlar ribbon strength member is particularly useful in a sonar towed array assembly. The strength member is self-adjusting when used with the termination member of the present invention, and the strength member is not subjected to damaging conditions which shorten its life.

Although only a single embodiment of the invention has been shown and described, it is to be clearly understood that the above described embodiment is merely illustrative of the principles of the present invention. Clearly, numerous and varied other arrangements can be readily devised in accordance with these principles by those skilled in the art without departing from the spirit and scope of the invention.

What is claimed:

1. Apparatus for use in splicing a first end of a strength ribbon to a second end of a strength ribbon, the ends of said strength ribbon having a plurality of strands, which comprises:

a baseboard having first and second ends and having a longitudinal center line extending from said first end toward said second end;

a first clamp mounted on said baseboard adjacent said first end and a second clamp mounted on said baseboard adjacent said second end, said first and second clamps being disposed on said longitudinal center line, said first and second clamps being for the clamping on said baseboard said first end and said second end to be spliced together, respectively;

a plurality of guide loops disposed on said baseboard in a first longitudinal line between said first and second clamps on one side of said longitudinal center line and a plurality of guide loops disposed on said baseboard in a second longitudinal line between said first and second clamps on the other side of said longitudinal center line, said guides being removable from said baseboard; and indicia on said baseboard related to said guide loops so that a plurality of strands with corresponding indicia can be engaged on said guide loops for the splicing thereof.

2. The apparatus of claim 1 wherein said guide loops in said first and second longitudinal lines are arranged in rows across from each other across said longitudinal center line.

3. The apparatus of claim 1 wherein there are four discrete indicia successively positioned adjacent the guide loops in said first longitudinal line of guide loops and successively positioned adjacent the guide loops in said second longitudinal line of guide loops.

4. The apparatus of claim 3 wherein said four discrete indicia are in the same order along said first and second longitudinal lines of guides but said indicia on said first and second longitudinal lines of guide loops start with a different discrete indicia.

5. The apparatus of claim 4 wherein said four discrete indicia are also associated with said first and second clamps so that ribbon ends clamped in said first and second clamps can be separated into four bundles, each corresponding to one of said indicia.

\* \* \* \* \*